Dec. 15, 1953          A. J. WOHLGEMUTH                2,662,406
               REFERENCE-JUNCTION COMPENSATOR
                 FOR THERMOCOUPLE PYROMETERS
                    Filed Sept. 10, 1952

ADOLPH J. WOHLGEMUTH
     INVENTOR.

BY
*Gaylor, Cifelli & Jurick*
     ATTORNEYS

Patented Dec. 15, 1953

2,662,406

UNITED STATES PATENT OFFICE 2,662,406

REFERENCE-JUNCTION COMPENSATOR FOR THERMOCOUPLE PYROMETERS

Adolph J. Wohlgemuth, Westfield, N. J., assignor to Weston Electrical Instrument Corporation, Newark, N. J., a corporation of New Jersey Application September 10, 1952, Serial No. 308,886

5 Claims. (Cl. 73—361)

This invention relates to temperature measuring devices and more particularly to a novel arrangement for properly setting the reference-junction compensator of a thermocouple pyrometer.

Thermocouple pyrometers, which are used extensively for the measurement of temperatures, generally include a potentiometer arrangement wherein the electromotive force generated by a thermocouple is balanced against, or compared with, a reference potential. Since such balance method of measurement depends for its accuracy upon the maintenance of a constant and precise reference potential the apparatus includes a simple means for checking, periodically, the level of the reference potential. Further, since the electromotive force generated by a thermocouple is determined by the temperature difference between the hot and cold junctions of the couple some means must be provided to compensate the cold end, or reference junction, for ambient temperature changes. Within certain limits, this can be done automatically by inserting into the electrical network a coil of wire which varies in resistance in precise accordance with the voltage change of the particular thermocouple with cold-end temperature changes. Manual cold-end compensators are also known. These consist of a hand-operated rheostat set by means of a calibrated dial. However, in order to set the rheostat properly the operator must first determine the actual ambient temperature reading. This generally is done by means of a glass stem thermometer disposed in the vicinity of the apparatus.

An object of this invention is the provision of a manual cold end compensator for a thermocouple pyrometer said compensator comprising a rheostat having a slide contact rotatable by the stem of a bimetallic thermometer that extends through the casing of the pyrometer housing.

An object of this invention is the provision of a cold end compensator for a thermocouple pyrometer having a potentiometer network housed in a casing, said compensator comprising a bimetallic thermometer having a pointer and a calibrated temperature scale visible externally of the casing and a stem passing through the casing wall, a fixed reference mark with which said pointer may be alined by rotating the entire thermometer, and a rheostat disposed within said casing said rheostat having its movable contact mechanically coupled to the stem of the thermometer whereby rotation of the thermometer to aline the pointer with the fixed reference mark will cause a corresponding rotation of the said movable contact.

These and other objects and advantages will be apparent from the following description when taken with the accompanying drawings. The drawings are for purposes of illustration and are not to be construed as defining the scope or limits of the invention, reference being had for the latter purpose to the appended claims.

In the drawings wherein like reference characters denote like parts in the several views.

Figure 1:
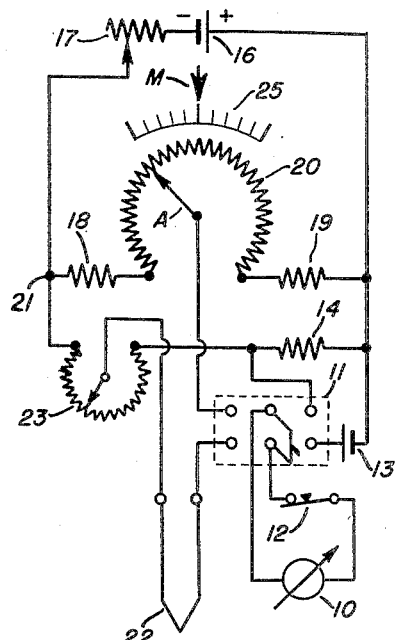
Figure 1 is a circuit diagram of a thermocouple pyrometer of the potentiometric balance type.

Reference is now made to Figure 1. The balance indicator of the device comprises a sensitive galvanometer 10 that is connected across the center contacts of a double-pole, double-throw switch 11 through the normally-closed, push-button switch 12. When the movable blades of the switch 11 are closed with the right hand contacts an electrical circuit is completed between the standard cell 13, the fixed resistor 14 and the galvanometer 10.

Since the potential of the standard cell and the resistance of the circuit connected thereacross are of constant, predetermined values, the current flowing through the resistor 14 will depend upon the voltage applied across the bridge that includes the fixed resistors 14, 18 and 19 and the slide-wire rheostats 20 and 23. The bridge voltage, supplied by the battery 16, is adjusted by means of the variable resistor 17 until the galvanometer 10 indicates zero. Under this condition the potential difference across the resistor 14 is exactly equal to the electromotive force of the standard cell. Since the other resistors 18, 19 and the slide-wire rheostats 20, 23, are of fixed value the current flow in each is exactly determined.

In the actual use of the apparatus for the measurement of temperature the thermocouple 22 is substituted for the standard cell 13 in the bridge circuit by closing the double-throw switch 11 with the left hand stationary contacts. Those skilled in this art will understand that when the switch 11 is so closed the slider A, of the slide-wire rheostat 20 is rotated until the galvanometer again indicates zero, whereby the voltage generated by the thermocouple can be read from a suitably calibrated dial that is attached to the rotary arm A of the rheostat. When the dial scale is calibrated in terms of voltage such voltage reading can be converted into temperature values by reference to a suitable tabulation giving the voltage variations, with temperature, of the particular thermocouple employed. I prefer, however, to calibrate the dial directly in temperature values. Thus, a direct reading of temperature is obtained by noting the scale reading with reference to the fixed mark M when the galvanometer indication is zero.

Figure 2:
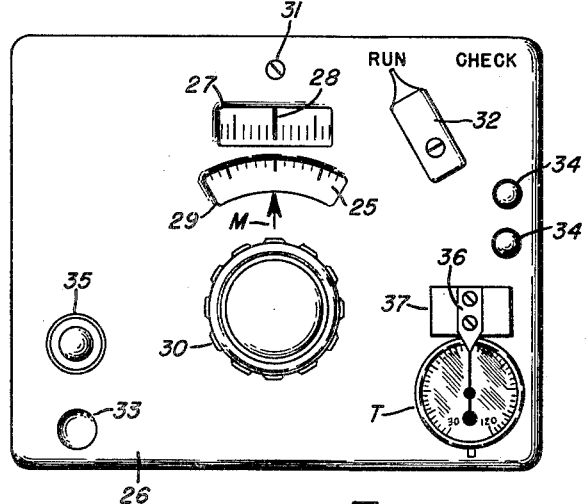
Figure 2 is a top view of such device contained within a suitable case and showing the external portion of my novel cold end compensator.

The above-described circuit is of conventional character and all components, with the exception of the thermocouple, are contained within a suitable housing whereby the apparatus is made a self-contained and portable. Figure 2 is a top view of such device. The front of the casing 26 is provided with a substantially rectangular opening 27, through which the galvanometer pointer 28 and associate scale are visible, and an arcuate opening 29 through which the calibrated scale 25 of slide wire dial is visible, such dial being rotatable by means of the exposed knob 30. As has been explained hereinabove, the reading of the scale 25 is obtained with reference to a fixed mark M which may be engraved in the housing front. Adjustment of the zero position of the galvanometer pointer is made by means of a conventional zero-adjuster screw 31, as is well known. Whereas the double-pole, double-throw switch 11 is shown as a blade switch in the circuit diagram of Figure 1, a rotary switch is actually used for this purpose. As shown in Figure 2 the setting of such rotary switch is controlled by a suitable knob 32, the positioning of such knob in the "check" or "run" positions corresponding to right hand, and left hand closures, respectively, of the blade switch in the Figure 1 circuit. The normally closed push button switch, that is connected in series with the galvanometer, is controlled by a conventional, spring-biased button 33 and the thermocouple is connected to the apparatus by means of the binding posts 34. A knob 35 serves as a means for adjusting the reference voltage level of the apparatus as has been explained with reference to resistor 17 in Figure 1.

Since the apparatus is designed to provide a direct reading of temperature in terms of the voltage generated by the thermocouple, correction must be made for ambient temperature changes, that is, temperature variations at the cold junction of the thermocouple. This is done by a reference-junction compensator which consists of a rheostat 23, see Figure 1, inserted into the electrical network. Such rheostat usually is provided with a calibrated dial which is set manually in accordance with an actual temperature reading obtained by means of a thermometer positioned at the instrument casing. In order to facilitate the proper setting of the compensating rheostat I provide a novel arrangement comprising a bimetallic thermometer having a stem passing through the front wall of the casing and mechanically coupled to the movable arm, or slider, of the compensating rheostat. As shown in Figure 2, the face of the thermometer is disposed externally of the casing and is associated with a fixed, reference member 36 that is affixed to a support 37 secured to the front of the casing panel 26.

Figure 3:
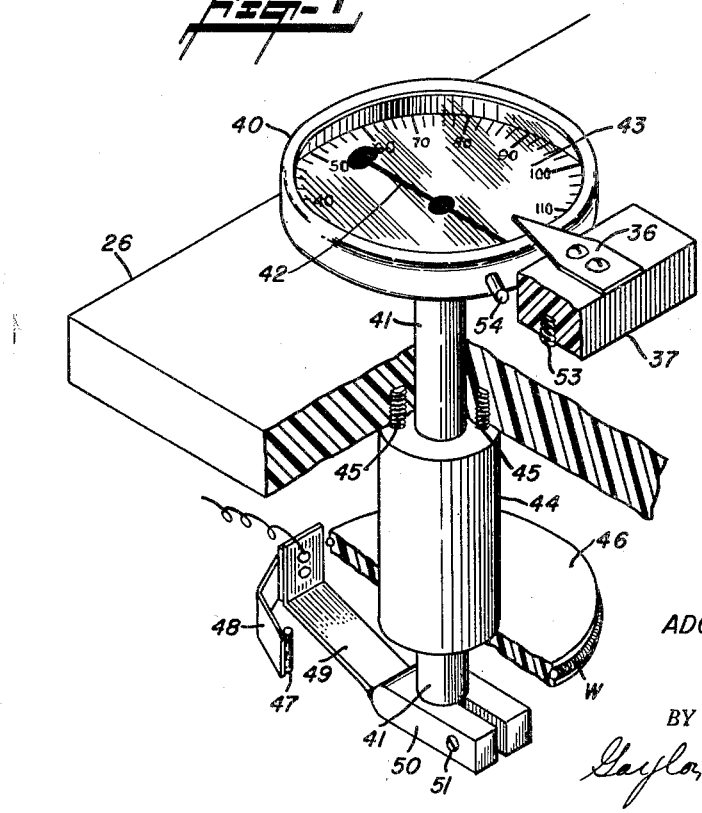
Figure 3 is an enlarged, fragmentary view, with parts broken away, showing the structural arrangement of the compensator.

Reference is now made to Figure 3 which is an enlarged, fragmentary view showing the constructional features of my temperature-compensating device. The bimetallic thermometer is of conventional construction and comprises a circular case 40 having a shell 41 secured to and extending therefrom. Disposed within the shell 41, and at the lower end thereof, is a helical coil of bimetal said coil having one end secured to the shell and the other end secured to a staff that extends upwardly through the shell and into the case 40. A pointer 42 is secured to such staff. As is well known, the bimetallic coil imparts a rotary movement to the pointer in accordance with temperature variations effective at the lower end of the protective shell 41, and direct indications of temperature are provided by the position of the pointer relative to a suitably-calibrated scale 43 secured in fixed position within the case 40. Although the thermometer may be calibrated for any desired range of temperature indications a range of 30–120° F. is suitable for present purposes.

The shell 41, of the thermometer, passes through a clearance hole in the front panel 26 of the pyrometer housing and through a clearance hole in the spacer-bushing 44, the latter being secured to the inner surface of the panel as by the two screws 45. A disc 46, of insulating material, is similarly secured to the lower end of the spacer-bushing. The helical resistance wire W, disposed along the periphery of the disc 46, corresponds to the fixed resistance winding of the compensating rheostat 23, shown in Figure 1. It may here be pointed out that the construction of rheostats, of the type shown in Figure 3, are well known, such devices being generally referred to as slide wire rheostats. The helical winding normally extends an angular distance of somewhat less than 360 degrees. Sliding contact with the resistance winding is established by a slider 47 that is affixed to a flexible leaf 48, made of spring material, and secured to a rigid, metallic arm 49 but insulated therefrom. The arm 49 is secured to a metal block 50 provided with a radial slot terminating in a hole adapted to accommodate the shell 41 of the thermometer. It will be apparent that the block 50 is rigidly secured to the thermometer shell by means of the screw 51 having its end threaded into a threaded hole in an appropriate section formed by the radial slot in the block. Thus, rotation of the thermometer case 40 imparts a corresponding rotation to the slider 47.

The fixed reference point for the thermometer comprises the pointed member 36 secured to the support 37 as by screws, the support being secured to the panel 36 by screws 53 passing upwardly through the panel. The ohmic resistance value of the compensating rheostat is preselected, with relation to the characteristics of the thermocouple, so that rotation of the entire thermometer to bring the pointer 42 into alinement with the member 36 (as shown in Figure 2) sets the rheostat properly to provide the necessary reference-junction compensation. In order to prevent rotation of the thermometer beyond the angular extent of its scale range a suitable stop 54 is secured to the thermometer case 40. The dimensions of the support 37 are such that the stop 54 will strike the ends of the support when one or the other end-marks of the thermometer scale are alined with the member 36. Accordingly, the slider of the compensating rheostat is secured to the thermometer shell such that the slider will not travel beyond the ends of the rheostat wire W when the thermometer, as a whole, is rotated to one or the other extreme positions.

The thermometer will indicate the actual temperature within the apparatus housing. As shown in Figure 2, the thermocouple binding posts 34 are positioned close to the thermometer and the compensating rheostat. Consequently, the setting of the compensating rheostat, as above described, will provide cold junction compensation within normally-acceptable limits. A more precise compensation can be obtained by making the internal lead connections, between the binding posts and the electrical network, of wires similar to those of the thermocouple, thereby bringing the cold end of the thermocouple into the pyrometer housing.

Having now described my invention it will be apparent my novel arrangement facilitates the manual setting of the reference-junction compensator. Once the thermometer pointer has been alined with the fixed reference mark, any change in the reference-junction temperature will immediately become apparent by a departure of the thermometer pointer from such alined condition. Inasmuch as the setting of the reference-junction compensator is done by alining the thermometer pointer with the fixed reference mark carried by the pyrometer housing it is not necessary that the thermometer include a calibrated scale of temperature values. However, I prefer to provide such temperature scale so that the device will serve the additional purpose of providing indications of the actual temperature values.

What I desire to protect by Letters Patent of the United States is set forth in the following claims.

I claim:

1. A reference-junction compensating arrangement for a thermocouple pyrometer having a thermocouple voltage-measuring circuit, said arrangement comprising a bimetallic thermometer including a temperature-sensitive coil disposed within a casing and a pointer rotatable relative to the casing, a fixed reference mark disposed external of the thermometer casing, thermometer-supporting means affording manual rotation of the thermometer casing to aline the said pointer with the said reference mark, and a rheostat connected into the measuring circuit of the pyrometer, said rheostat having a movable contact arm mechanically coupled to the thermometer casing and said rheostat being adapted to have its effect on the measuring circuit varied by movement of said contact arm.

2. A reference-junction compensating arrangement for a thermocouple pyrometer having a thermocouple voltage measuring circuit disposed within housing, said arrangement comprising a bimetallic thermometer including a rotatable pointer visible externally of the pyrometer housing and disposed within a casing that extends through a wall of said housing, a fixed reference mark carried by the housing, and a compensating rheostat disposed within the housing and connected in the measuring circuit, said rheostat having a resistance winding that is fixed with respect to the housing and a cooperating movable arm mechanically coupled to the casing of the thermometer, said rheostat being adapted to have its effect on the measuring circuit varied by movement of said movable arm.

3. In a self-contained thermocouple pyrometer of the type including a compensating rheostat having a rotary arm that is manually settable to compensate for reference-junction temperature changes of the thermocouple, the improvement comprising a bimetallic thermometer having a circular casing disposed external of the pyrometer housing, an indicating pointer rotatable within the casing, and a bimetallic coil connected to the pointer and disposed within a shell passing into the pyrometer housing through a clearance hole in one wall of the housing; a fixed reference mark carried by such wall of the housing and disposed proximate to the thermometer casing; stop means limiting the extent of the angular rotation of the said shell within the clearance hole; and adjustable connecting means securing the rotary arm of the compensating rheostat to the shell of the thermometer.

4. The invention as recited in claim 3, wherein the thermometer includes a calibrated scale of temperature values cooperating with the pointer and disposed within the thermometer casing.

5. The invention as recited in claim 4, wherein said stop means comprises a fixed support carrying said fixed reference mark and a radially-extending member secured to and extending outward of the thermometer casing, said member being adapted to strike said support upon a predetermined rotation of the thermometer casing in one or the other direction.

ADOLPH J. WOHLGEMUTH.

References Cited in the file of this patent

UNITED STATES PATENTS

| Number | Name | Date |
|---|---|---|
| 1,132,591 | Leeds | Mar. 23, 1915 |
| 2,109,222 | Ryder | Feb. 22, 1938 |
| 2,277,365 | Michael | Mar. 24, 1942 |